United States Patent
Rantalainen et al.

(10) Patent No.: US 6,665,540 B2
(45) Date of Patent: Dec. 16, 2003

(54) METHOD AND SYSTEM FOR LOCATING A MOBILE TERMINAL IN A CELLULAR RADIO NETWORK

(75) Inventors: Timo Rantalainen, Helsinki (FI); Jani Moilanen, Helsinki (FI)

(73) Assignee: Nokia Mobile Phones, Ltd., Espoo (FI)

(*) Notice: Subject to any disclaimer, the term of this patent is extended or adjusted under 35 U.S.C. 154(b) by 524 days.

(21) Appl. No.: 09/776,405

(22) Filed: Feb. 2, 2001

(65) Prior Publication Data

US 2002/0107028 A1 Aug. 8, 2002

(51) Int. Cl.$^7$ ................................................ H04Q 7/20
(52) U.S. Cl. ............................ 455/456.5; 455/67.16; 455/502; 342/450
(58) Field of Search ........................ 455/502, 456.1, 455/456.2, 456.5, 456.6, 67.16; 342/450, 458, 384; 340/539.13

(56) References Cited

U.S. PATENT DOCUMENTS 6,356,763 B1 * 3/2002 Kangas et al. ............ 455/456.1
6,456,237 B1 * 9/2002 Ruutu et al. ................ 342/387
6,597,914 B1 * 7/2003 Silventoinen et al. ....... 342/450

FOREIGN PATENT DOCUMENTS

EP          0936758          8/1999

OTHER PUBLICATIONS

Patent application Publication, Pub No. US 2003/0096622 Title: Locating A Wireless Station, Publication Date: May 22, 2003 Author: JaniMoilanen.*

3GPP TS 04.31 V7.3.0 (Nov. 2000) 3$^{rd}$ Generation Partnership Project; Technical Specification Group GSM EDGE Radio Access Network; Location Services(LCS); Mobile Station (MS)—Serving Mobile Location Centre (SMI C) Radio Resource LCS Protocol (RRLP) (Release 1998).

* cited by examiner

Primary Examiner—Nguyen T. Vo
Assistant Examiner—Farima Farkhondar
(74) Attorney, Agent, or Firm—Ware, Fressola, Van Der Sluys & Adolphson LLP

(57) ABSTRACT

A method and system for estimating the location of a mobile station in a telecommunications network having a reference base station and a plurality of neighboring base stations. At the beginning of the E-OTD measurement, the mobile station may be provided with the expected OTD values in the reference base station site, possibly instead of RTD values of the neighboring base stations, to make it possible for the mobile station to calculate the uncertainty in the measured OTD due to its unknown location. Alternatively, the network provides the mobile station the expected OTD values in its current location, and the estimated uncertainty of those values. When the uncertainty is greater than a predetermined value, the mobile station makes E-OTD measurements based on the SCH burst. Otherwise, the mobile station makes measurements based on normal/dummy bursts, and/or aligns the time window for taking samples from signals received from neighboring base stations.

28 Claims, 3 Drawing Sheets

METHOD AND SYSTEM FOR LOCATING A MOBILE TERMINAL IN A CELLULAR RADIO NETWORK

FIELD OF THE INVENTION

The present invention relates generally to estimating the position of a mobile communications device based on the arrival time of signals broadcast by a plurality of base transceiver stations.

BACKGROUND OF THE INVENTION

In a cellular radio telecommunications network, it is desirable in many circumstances to be able to at least approximately identify the position of a mobile station (MS) to within a small area. For example, the approximate position of the mobile station may be useful for dispatching an emergency unit to the mobile station site when an emergency call is made from the mobile station. One of the methods of estimating the approximate position of the mobile station uses the time of arrival at the mobile station of the synchronization sequences transmitted at regular intervals by at least three base transceiver stations (BTSs), or base stations, of the cellular network. These base stations include the serving base station of the mobile station and the neighboring base stations. The measured times of arrival (TOAs), are relative to the internal clock of the mobile station, which is synchronized with the synchronization sequences transmitted by the serving base station and user and signaling data transmitted between the mobile station and the cellular network via the serving base station. Based on the TOAs, the Observed Time Differences (OTDs) are calculated. The OTDs represent the time difference of arrival of signals between the serving BTS and the neighboring BTSs. Assuming that the neighboring base stations and the serving base station transmit their respective synchronization sequences at the same time, then the measured OTDs for the neighboring base stations represent the propagation times between the respective neighboring base stations and the mobile station. In practice, the neighboring base stations are not synchronized with the serving base station. Instead, a timing offset or a Real Time Difference (RTD) is used to calculate the geometric time difference (GTD) from the OTD. The RTD regarding a neighboring base station is defined as the difference between the transmission time from that neighboring base station and the transmission time from the serving base station. The RTD is known to a serving mobile location center (SMLC) of the telecommunications network. As disclosed in EP 0 936 758 A2, given the GTDs from a number of neighboring BTSs relative to the serving BTS is known, the approximate position of the mobile station can be obtained from intersecting hyperbolas. This method is known as E-OTD, or Enhanced OTD, in a TDMA system.

The RTD values can be sent to the mobile station to enhance the measurement process. By knowing the RTD value, the mobile station can in theory align the reception window, and take only samples from the point of signal where the training sequence (of normal or dummy burst) is expected to be located. This means that the measurement of frequency correction channel (FCCH) and synchronization channel (SCH) bursts can be avoided, and thus the OTD measurement process is much faster.

The above-described method is useful when the uncertainty of the position of the mobile station is sufficiently small and that is known. In this situation, the mobile station aligns the reception window used for OTD measurements by utilizing the RTDs provided by the network in the E-OTD measurement command. A major setback for this method is that the uncertainty of the position of the mobile station may cause the mobile station not to use the RTDs. It is possible that the OTD to be measured in the current position of the mobile station differs from the reported RTD by several bit periods and even up to tens of bit periods. That makes the RTD values unusable, because the correlation properties of normal and dummy bursts are so poor that this kind of uncertainty is not allowed. Instead, the mobile station needs to first measure the frequency correction channel (FCCH) and synchronization channel (SCH) burst.

Usually, when the uncertainty of the position of the mobile station is small (e.g., comparable to 2 bits), this uncertainty can be tolerated in the OTD measurements. This is particularly true when the cell size is small such as that in an urban environment. In such an environment, if the MS knows that the uncertainty is so small (i.e. cells are small), the RTD value would very likely be useful in the vast majority of the cases. However, because the location of the mobile station is unknown, and thus the magnitude of the uncertainty is also unknown, it is possible that the provided RTD values would not be used by the mobile station at all.

Thus, it is advantageous and desirable to provide a reliable method for estimating the location of the mobile station, and thus the uncertainty of the arrival times from neighboring BTSs.

SUMMARY OF THE INVENTION

The present invention makes use of the uncertainty of the arrival times from respective neighboring base stations, caused by the uncertainty of the location of the mobile station, to allow the mobile station to calculate a suitable reception window and select suitable bursts for arrival time measurements based on values provided by the network.

According to the first aspect of the present invention, a method of estimating a location of a mobile station in a mobile telecommunications network having a first base station and a plurality of second base stations neighboring the first base station for providing communication links to the mobile station, wherein the first base station is located at a first site and second base stations are located at respective second sites, and the first and second base stations provide synchronization channel bursts and further bursts to the mobile station for allowing the mobile station to make arrival time measurements. The method comprises the steps of:

providing the mobile station a first value regarding transmission of signals from the respective second base stations to the mobile station;

calculating a second value representative of uncertainty in said arrival time measurements based on the first value and optionally a distance between the mobile station and the first site; and providing the mobile station a predetermined value such that the mobile station makes said arrival time measurements based on the synchronization channel bursts when the second value is greater than the predetermined value, and the mobile station carries out a time adjustment process when the second value is smaller than or equal to the predetermined value.

Preferably, the first base station is a serving station and the first value is indicative of an expected arrival time of the signals from the respective second base stations to the mobile station as if the mobile station is located at the first site, and the second value is calculated by the mobile station.

Alternatively, the first value is indicative of the distances between the first site and the respective second sites, and the second value is calculated by the mobile station.

Alternatively, the first value is indicative of an expected arrival time of signals from the respective second base stations to the current location of the mobile, as estimated by the serving mobile location center, and the second value is calculated by the serving mobile location center and provided to the mobile station. Furthermore, the second value may also be calculated based on a cell identity of the first base station, antenna sector information regarding the location of the mobile station, and the received signal levels from the first and second base stations as reported by the mobile station.

Preferably, the distance from the first site to the mobile station is provided to the mobile station by the network.

Preferably, the mobile station makes the arrival time measurements based on the further bursts in the time adjustment process when the second value is smaller than or equal to the predetermined value.

Alternatively, the mobile station aligns a time window for taking samples in the signals transmitted from the respective second base stations in the time adjustment process utilizing the second value when the second value is smaller than or equal to the predetermined value.

Preferably, the mobile station further makes the arrival time measurements based on the further bursts in addition to making said arrival time measurements based on the synchronization channel bursts when the second value is greater than the predetermined value.

Preferably, the predetermined value is stored in the mobile station, but it is possible that the predetermined value can be sent to the mobile station by the mobile telecommunications network.

According to the second aspect of the present invention, a system for estimating a location of a mobile station in a mobile telecommunications network having a first base station and a plurality of second base stations neighboring the first base station for providing communication links to the mobile station, wherein the first base station is located at a first site and second base stations are located at respective second sites, and the first and second base stations provide synchronization channel bursts and further bursts to the mobile station for allowing the mobile station to make arrival time measurements. The system comprises:

a first means for providing the mobile station a first value regarding transmission of signals from the respective second base stations to the mobile station;

a second means, responsive to the first value, for providing a second value representative of the uncertainty in said arrival time measurements based on the first value and optionally the distance between the mobile station and the first site; and a third means, responsive to the second value and a predetermined value, for making said arrival time measurements based on the synchronization channel bursts when the second value is greater than the predetermined value, and the mobile station carries out a time adjustment process when the second value is smaller than or equal to the predetermined value.

Preferably, the first base station is a serving base station and the first value is indicative of an expected arrival time of the signals from the respective second base stations to the mobile station as if the mobile station is located at the first site, and the second means is located in the mobile station for calculating the second value.

Alternatively, the first base station is a serving base station and the first value is indicative of a distance between the first site and a respective second site, and the second means is located in the mobile station for calculating the second value.

Alternatively, the first value is indicative of an expected arrival time of signals from the respective second base stations to the current location of the mobile station, as estimated by a serving mobile location center, and the second means is located in the serving mobile location center for calculating the second value and providing a signal indicative of the second value to the mobile station.

Preferably, the mobile station makes said arrival time based on the further bursts in the time adjustment process when the second value is smaller than or equal to the predetermined value.

Alternatively, the mobile station aligns a time window for taking samples in the transmitted signals from the respective second base stations in the time adjustment process when the second value is smaller than or equal to the predetermined value.

Preferably, the predetermined value is stored in the mobile station, but the predetermined value can also be provided to the mobile station by the mobile telecommunications network.

The present invention will become apparent upon reading the description taken in conjunction with FIGS. 1 to 3.

DETAILED DESCRIPTION OF THE INVENTION

Figure 1:
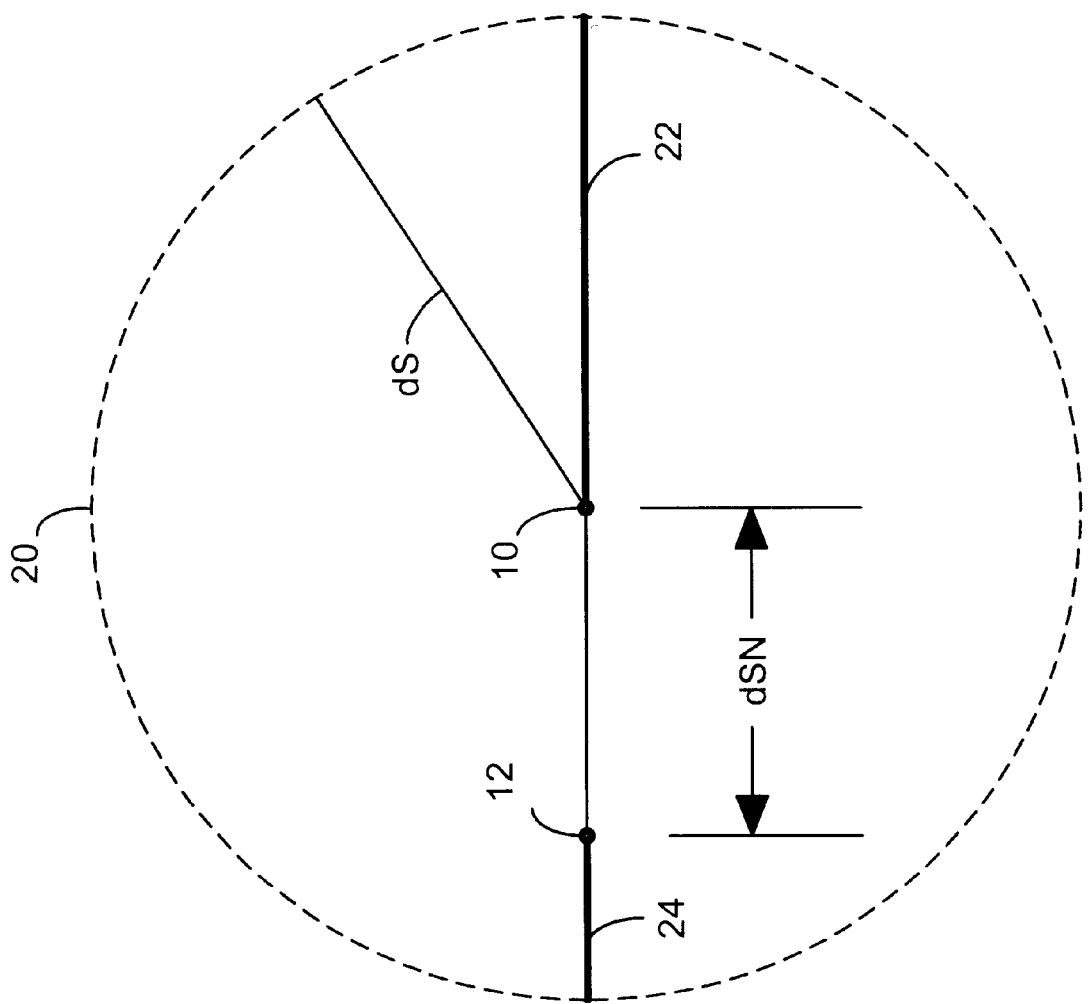
FIG. 1 is a diagrammatic representation illustrating the uncertainty in arrival time measurements caused by the uncertainty in the location of the mobile station.

In the preferred embodiment of the present invention, the network provides the mobile station in the E-OTD command with "expected OTD values at the serving BTS site", instead of the RTD values between the serving and the neighboring BTS. The expected OTD value at the serving BTS site, with regard to a neighboring BTS, is defined herein as the E-OTD value that the MS would measure if it were located at the serving BTS site. As shown in FIG. 1, the serving BTS site is denoted by reference numeral 10 and one of the neighboring BTS sites is denoted by reference numeral 12. The distance between the serving BTS site 10 and the neighboring BTS site 12 is denoted by dSN. The location of the MS (102, see FIG. 2) is unknown, but its distance to the serving BTS site 10 is known (with some error margin). In the case of MS assisted E-OTD, the MS has a channel allocated thereto—at least when the MS receives the E-OTD measurement command. Thus, the MS knows the current Timing Advance (TA) value. The use of timing advance is an attempt to make signals coming from the different mobile stations arrive at the BTS at the right time. For that purpose, the BTS measures the timing delay of the MS. If the bursts corresponding to an MS arrive at the BTS too late and overlap with other bursts, the BTS tells the MS to advance the transmission of its bursts. Thus, the TA value is related to the distance between the MS and the serving BTS site. With the current TA known, the current distance of the MS to the serving BTS site 10, which is denoted by dS, is also known. dS is substantially equal to TA/2. Accordingly, the possible location of the MS is somewhere along the circumference of the circle 20, and the uncertainty area of the mobile station location is substantially within or around the circle 20. The MS may actually be located slightly outside the circle 20 due to measurement errors.

The quantity OTD is defined as the time of arrival (TOA) to the MS, regarding the neighboring BTS site 12, minus the time of arrival regarding the serving BTS site 10. The expected OTD is defined as the sum of dSN and the RTD regarding the neighboring BTS site 12. Or OTD=TOA(neig_BTS)-TOA(serv_BTS)

RTD=transmission time (neig_BTS)-transmission time (serv_BTS)

Expected OTD=RTD+(dSN/C), where C denotes the speed of light

Because the location of the MS is unknown, the maximum measured OTD is on the line 22 and the minimum measured OTD is on the line 24. Accordingly, we have Max_measured OTD=expected OTD Min_measured OTD=expected OTD-2*dS The uncertainty in the E-OTD measurements is between Min_measured OTD and Max_measured OTD. In other words, the uncertainty in the measured OTD value is substantially equal to twice the distance between the MS and the serving BTS site 10. For example, if the expected OTD value at the serving BTS site is 5 bit periods and the distance between the MS and the serving BTS site is 1 bit period (TA=2), then the measured OTD by the MS is between 3 and 5 bit periods. The uncertainty is equal to 2 bit periods. Using the calculated uncertainty in the measured OTD value regarding a neighboring BTS site, the MS can align its reception window so that it takes samples in the signals received from that neighboring BTS at the time when the training sequence of the desired burst (normal, dummy, or SCH) occurs.

It is also possible to use a predetermined value such that when the uncertainty is greater than the predetermined value, the mobile station will measure the OTD from the normal and dummy bursts after measuring the SCH burst. However, when the uncertainty is equal to or smaller than the predetermined value, the mobile station is caused to measure the OTD directly from the normal and dummy bursts without considering the SCH burst. For example, the predetermined value can be 1 or 2 or 3 bit periods. It should be noted that the E-OTD measurements based on the SCH burst are usually more reliable because the SCH has the longest training sequence among the different types of bursts. A normal burst has a rather short training sequence. The correlation properties of the dummy burst are rather poor. However, the SCH bursts occur infrequently. Thus, without measuring the SCH burst, the E-OTD measurements can be made significantly faster.

In an alternative implementation scenario, the network provides the MS in the E-OTD command with "expected OTD in an estimated current location of MS". The SMLC may estimate the MS current location, e.g. based on Cell Identity, TA, antenna sector information (regarding the location of the MS) or received signal levels (from the serving and neighboring BTSs as reported by the MS). In this case an additional uncertainty value that is indicative of the uncertainty of the "expected OTD in the estimated current location of MS" can be sent from the network to the MS. Accordingly, the MS uses this uncertainty value in a manner similar to the way the MS uses the uncertainty value calculated by the MS in the previously described implementation scenario. In this alternative scenario, because the TA value is not required to be available, it is also applicable to the MS based E-OTD method when the MS has no connection to the network. For example, the network sends the following two values to the mobile station: the "expected OTD in the estimated current location of MS" (+20 bit periods) and the uncertainty value (2 bit periods). Accordingly, the OTD measured by the mobile station is substantially within the range of 18 to 22 bit periods. Based on the uncertainty in OTD value, the MS can align its reception window to take samples in the signals received from that neighboring BTS at the time when the training sequence of the desired burst (normal, dummy, or SCH) occurs, or make OTD measurements from the training sequence of different bursts, depending on whether the uncertainty is smaller or greater than the predetermined value.

The following formulae are used to illustrate how the additional uncertainty value is calculated. Assuming that a base station BTS 1 is located at $(x_1, y_1)$, and another base station BTS2 is located at $(x_2, y_2)$, and if the estimate for the MS current location is $(x_0, y_0)$ within an accuracy of R meters, the uncertainty of expected OTD related to BTS1 and BTS2 in estimated current location of the MS is equal to $(RD_{max} - RD_{min})/c$, where $RD_{max} = \max\{X | X = \sqrt{(x_2-x)^2+(y_2-y)^2} - \sqrt{(x_1-x)^2+(y_1-y)^2}, (x,y) \in P\}$, $RD_{min} = \min\{X | X = \sqrt{(x_2-x)^2+(y_2-y)^2} - \sqrt{(x_1-x)^2+(y_1-y)^2}, (x,y) \in P\}$, $P = \{(x,y) | \sqrt{(x_0-x)^2+(y_0-y)^2} \leq R\}$, and c=speed of radio waves.

According to the above formulas, the maximum uncertainty value is equal to 2*R/c, when the estimated location of MS is located on a straight line that goes through the BTS1 and BTS2 sites. For example, if the MS current location is known within an accuracy of 1000 meters, the uncertainty of the expected OTD in the estimated location of MS, in the worst case, is ±2*1000/c≈6.67 μs. However, the uncertainty can be significantly smaller depending on the geometry.

In yet another implementation scenario of the MS based E-OTD, the network sends the RTD values to the MS, and the MS calculates the distance between the serving BTS site and the site of each of the neighboring BTSs. Based on the calculated distance, the MS further calculates the expected OTD value at the serving BTS site, and then the uncertainty in the measured OTD for each neighboring BTS (assuming that TA value is available). The uncertainty with regard to the neighboring BTSs and due to the unknown location of the MS, is plus or minus the distance between the BTSs. For example, if the RTD of a certain neighboring BTS is +7 bit periods and the distance between that neighboring BTS and the serving BTS is 10 bit periods, then the OTD measured by the mobile station is substantially within the range of −3 to 17 bit periods. Based on the uncertainty in OTD value, the MS can align its reception window to take samples in the signals received from that neighboring BTS at the time when the training sequence of the desired burst (normal, dummy, or SCH) occurs, or make OTD measurements from the training sequence of different bursts depending on whether the uncertainty is smaller or greater than the predetermined value, as in the case of MS assisted E-OTD.

Figure 2:
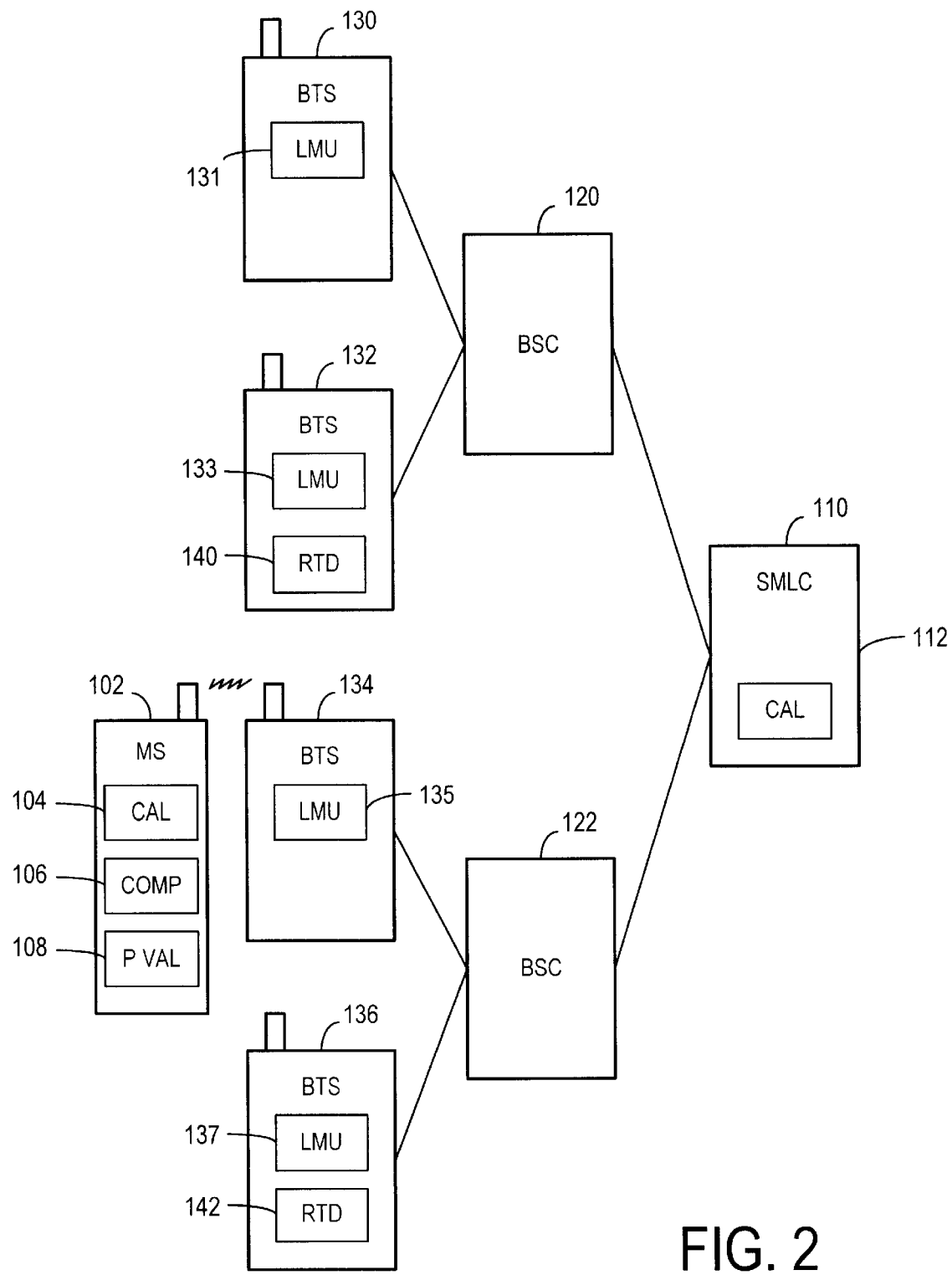
FIG. 2 is a diagrammatic representation illustrating the system for estimating the location of the mobile station in a mobile telecommunications network, according to the present invention.

FIG. 2 is diagrammatic representation illustrating part of a mobile telecommunications network that is related to E-OTD. As shown, the network 100 comprises a Serving Mobile Location Center (SMLC) 110, which is responsible for requesting that a mobile station be positioned. The SMLC 110 is connected to a plurality of base station controllers (BSC) 120 and 122, each of which controls a group of base stations, or base transceiver station (BTS) 130, 132, 134 and 136. The SMLC may also be integrated to a BSC, or connected to the BSCs through MSC/SGSN, where MSC is the Mobile Serving Switching Center, and SGSN is the Serving GPRS (General Packet Radio Service) Support Node. Some or each of the BTSs 130, 132, 134, 136 has a location measurement unit (LMU) (integrated to BTS or connected to BTS) 131, 133, 135, 137, for providing information to the SMLC 110 regarding BTS timing data. BTS 132 includes an RTD unit 140 and BTS 136 includes an RTD unit 142 for providing RTD values to the SMLC 110. It should be noted that, for E-OTD applications, the LMUs may have the same function as the RTD units 140 and 142 and, therefore, the LUMs may not be required. As shown in FIG. 2, BTS 134 is the serving BTS to the mobile station (MS) 102. The BTSs 130, 132 and 136 are the neighboring BTSs. The SMLC 110 has a means 112 for calculating the expected OTD values in the serving BTS site and providing the same to the MS 102, in the case of MS assisted E-OTD, to allow the MS 102 to calculate the uncertainty in the measured OTD. The SMLC 110 knows the RTD of the neighboring BTSs and the distance between the serving BTS and the respective neighboring BTSs. In the case of MS based E-OTD, the MS 102 can obtain the coordinates of the involved BTSs from the SMLC 110 so that it can calculate the distance between the serving BTS and the respective neighboring BTSs. The MS 102 uses a means 104 for calculating the distance, and the uncertainty in the measured OTD. The MS 102 also uses a means 106 to compare the uncertainty with a predetermined value 108 to decide the next action step, as described hereinabove. At the start of the E-OTD process, the SMLC 110 sends an E-OTD command to the MS 102 for E-OTD measurements, and the MS 102 is expected to align the reception window used for receiving signals from neighboring BTSs (in relation to serving BTS timing). When the received signals are correlated against the training sequence, this reception window has a significant effect on the correlation result.

Figure 3:
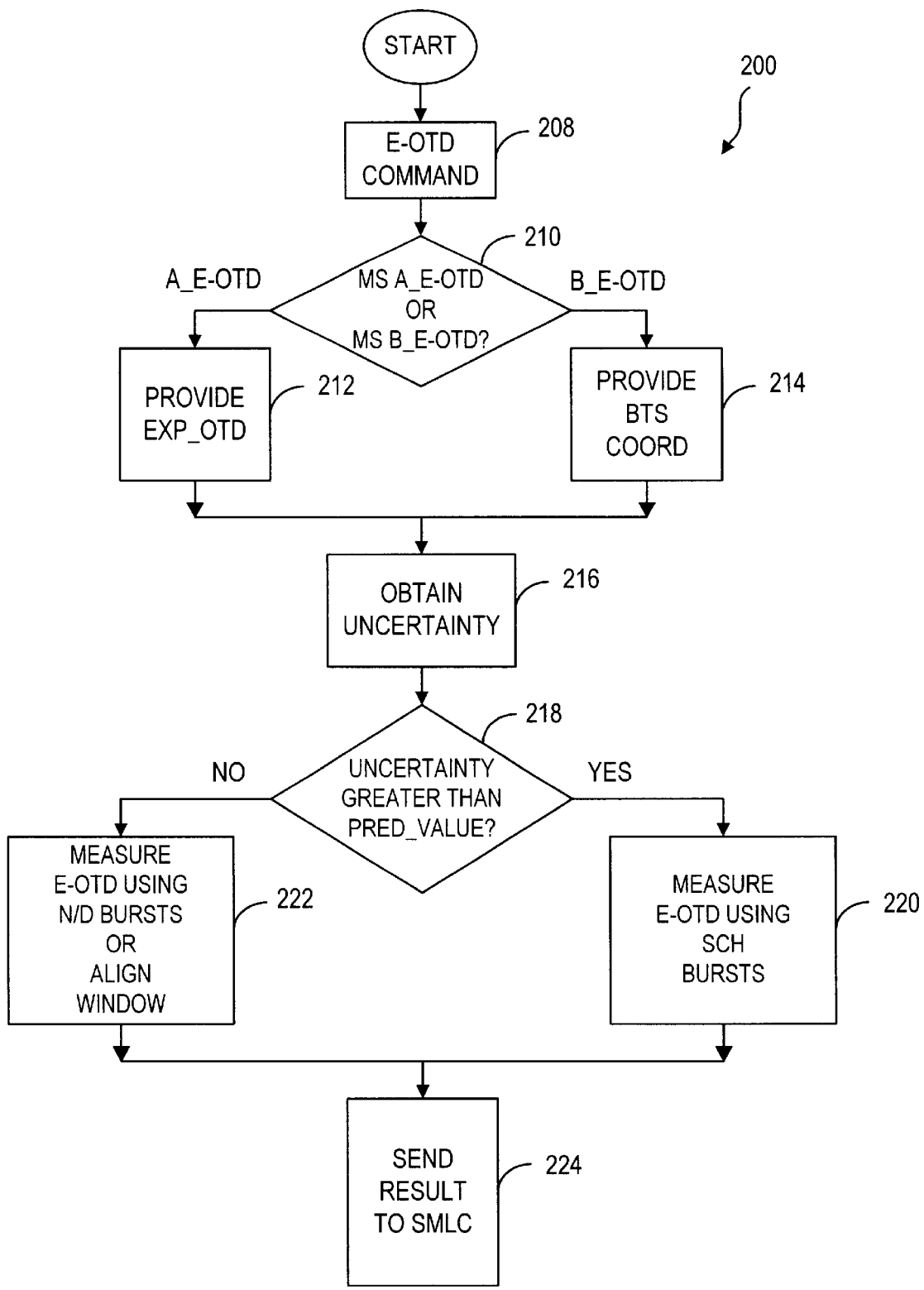
FIG. 3 is a flow chart illustrating the method of estimating the location of a mobile station, according to the present invention.

FIG. 3 is a flow chart illustrating the method of estimating the location of a mobile station. As shown in flow chart 200, the SMLC sends an E-OTD command to the MS to start the E-OTD measurement process at step 208. At step 210, it is determined whether the E-OTD measurements are for MS assisted E-OTD or MS based E-OTD. In the case of MS assisted E-OTD, the MS is provided with the "expected OTD values in the serving BTS site", at step 212. Accordingly, the MS calculates the uncertainty in the measured OTD, at step 216. Alternatively, the MS is provided with the "expected OTD values in the current location of the MS" by the SMLC, which also provides the MS with the uncertainty, at step 212. Accordingly, the MS obtains the uncertainty for comparison purposes at step 216. In the case of MS based E-OTD, the MS is provided with RTD values and the coordinates of the serving and neighboring BTS sites to allow the MS to calculate the distance between the serving BTS and the respective neighboring BTSs, as step 214, and the MS calculates the uncertainty in the measured OTD at step 216. At step 218, it is determined whether the uncertainty is greater or smaller than a predetermined value. If the uncertainty is greater than the predetermined value, the MS makes E-OTD measurements based on the SCH bursts, at step 220. If the uncertainty is smaller than or equal to the predetermined value, then the MS makes E-OTD measurements based on normal or dummy bursts, and/or aligns the reception window for taking samples from signals received from the neighboring BTSs, at step 222. In the case of MS Assisted E-OTD, the E-OTD measurement results are sent to the SMLC for MS location estimation, at step 224. In the case of MS Based E-OTD, the E-OTD measurement results are used by the MS to calculate the location estimate.

In the MS based E-OTD, it is also possible to send the expected OTI) values in the serving BTS site to the MS, instead of the RTD values, as in the case of MS assisted E-OTD. Because the MS knows the location of the neighboring and serving BTSs, it can calculate the RTDs from the expected OTD values in the serving BTS site. In other words, the MS can obtain the RTD value of a neighboring BTS from the expected OTD of that neighboring BTS site by subtracting therefrom the distance between that neighboring BTS and the serving BTS, or $$RTD = \text{expect } OTD - dSN$$

Accordingly, in both the MS assisted E-OTD and the MS based E-OTD cases, it is sufficient to provide the MS with the expected OTD values at the serving BTS site to allow the MS to calculate the uncertainty in the measured OTD.

It should be noted that, in some cases, the serving base station is not required and, in some cases, the serving base station is used as a reference station to the mobile station. In that latter cases, the base station 134 in FIG. 2 is merely a reference station for the SMLC 110 to send the measurement command to the MS 102. Furthermore, the reference base station can be any other base station than the serving base station.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of estimating a location of a mobile station in a mobile telecommunications network having a first base station, and a plurality of second base stations neighboring the first base station for providing communication links to the mobile station, wherein the first base station is located at a first site and second base stations are located at respective second sites, and the first and second base stations provide synchronization channel bursts and further bursts to the mobile station for allowing the mobile station to make arrival time measurements, said method comprising the steps of:

providing the mobile station a first value regarding transmission of signals from the respective second base stations to the mobile station;

calculating a second value representative of an uncertainty in said arrival time measurements based on the first value and optionally a distance from the first site to the mobile station; and providing the mobile station a predetermined value such that the mobile station makes said arrival time measurements based on the synchronization channel bursts when the second value is greater than the predetermined value, and the mobile station carries out a time adjustment process when the second value is smaller than or equal to the predetermined value.

2. The method of claim 1, wherein the first station is a serving station to the mobile station, and the first value is indicative of an expected arrival time of the signals from the respective second base stations to the mobile station as if the mobile station is located at the first site.

3. The method of claim 2, wherein the distance from the first site to the mobile station is provided to the mobile station by the network.

4. The method of claim 3, wherein the second value is calculated by the mobile station.

5. The method of claim 2, wherein the second value is calculated by the mobile station.

6. The method of claim 1, wherein the first base station is a serving station to the mobile station, and wherein the first value is indicative of distances between the first site and the respective second sites and the distance from the first site to the mobile station is provided to the mobile station by the network.

7. The method of claim 1, wherein the first base station is a serving station to the mobile station, and wherein the first value is indicative of distances between the first site and the respective second sites.

8. The method of claim 1, wherein the first value is indicative of an expected arrival time of signals from the respective second base stations to a current location of the mobile station, and the second value is calculated by a serving mobile location center and provided to the mobile station.

9. The method of claim 8, wherein the first value is estimated by the serving mobile location center and provided to the mobile station.

10. The method of claim 8, wherein the second value is calculated partly based on a cell identity of the first base station.

11. The method of claim 8, wherein the second value is calculated partly based on a cell identity of the serving base station.

12. The method of claim 8, wherein the second value is calculated partly based on antenna sector information regarding a location of the mobile station.

13. The method of claim 8, wherein the second value is calculated partly based on received signal levels from the first and second base stations as reported by the mobile station.

14. The method of claim 1, wherein the mobile station makes the arrival time measurements based on the further bursts in the time adjustment process when the second value is smaller than or equal to the predetermined value.

15. The method of claim 1, wherein the mobile station aligns a time window for taking samples in the signals transmitted from the respective second base stations in the time adjustment process when the second value is smaller than or equal to the predetermined value.

16. The method of claim 1, wherein the mobile station further makes the arrival time measurements based on the further bursts, in addition to making said arrival time measurements based on the synchronization channel bursts, when the second value is greater than the predetermined value.

17. The method of claim 1, wherein the predetermined value is stored in the mobile station.

18. The method of claim 1, wherein the predetermined value is provided to the mobile station by the network.

19. A system for estimating a location of a mobile station in a mobile telecommunications network having a first base station and a plurality of second base stations neighboring the first base station for providing communication links to the mobile station, wherein the first base station is located at a first site and second base stations are located at respective second sites, and the first and second base stations provide synchronization channel bursts and further bursts to the mobile station for allowing the mobile station to make arrival time measurements, said system comprising:

a first means for providing the mobile station a first value regarding transmission of signals from the respective second stations to the mobile station;

a second means, responsive to the first value, for providing a second value representative of uncertainty in said arrival time measurements based on the first value and optionally a distance from the first cite and the mobile station; and a third means, responsive to the second value and a predetermined value, for making said arrival time measurements based on the synchronization channel bursts when the second value is greater than the predetermined value, and the mobile station carries out a time adjustment process when the second value is smaller than or equal to the predetermined value.

20. The system of claim 19, wherein the first base station is a serving base station to the mobile station, and the first value is indicative of an expected arrival time of the signals from the respective second base stations to the mobile station as if the mobile station is located at the first site.

21. The system of claim 19, wherein the first base station is a serving base station to the mobile station, and the first value is indicative of a distance between the first site and a respective second site.

22. The system of claim 19, wherein the first value is indicative of an expected arrival time of the signals from the respective second base stations to a current location of the mobile station.

23. The system of claim 19, wherein the first station is a reference station and the expected arrival time of the signals from the respected second base stations to the current location of mobile station is estimated by a serving mobile location center.

24. The system of claim 19, wherein the second means is located in the mobile station.

25. The system of claim 19, wherein the second means is located in a serving mobile location center.

26. The system of claim 19, wherein the mobile station makes said arrival time measurements based on the further bursts in the time adjustment process when the second value is smaller than or equal to the predetermined value.

27. The system of claim 19, wherein the mobile station aligns a time window for taking samples in the transmitted signals from the respective second base stations in the time adjustment process when the second value is smaller than or equal to the predetermined value.

28. The system of claim 19, wherein the predetermined value is stored in the mobile station.

* * * * *